United States Patent [19]

Blumenthal

[11] Patent Number: 4,940,412
[45] Date of Patent: Jul. 10, 1990

[54] METHOD OF MANUFACTURING ANATOMICAL MODELS

[75] Inventor: Rafael Blumenthal, Kiryat Tivon, Israel

[73] Assignee: Elscint Ltd., Haifa, Israel

[21] Appl. No.: 279,121

[22] Filed: Dec. 2, 1988

[30] Foreign Application Priority Data

Dec. 8, 1987 [IL] Israel ........................................ 84752

[51] Int. Cl.⁵ ............................................. G09B 23/28
[52] U.S. Cl. ...................................... 434/267; 434/262; 434/269; 623/901
[58] Field of Search .................. 623/901, 16; 434/267, 434/269, 274

[56] References Cited

U.S. PATENT DOCUMENTS 4,371,345  2/1983  Palmer et al. ........................ 434/269

FOREIGN PATENT DOCUMENTS 8300403  2/1983  World Int. Prop. O. .......... 434/269

OTHER PUBLICATIONS

Efrem Fudin, "Sculpting Parts with Light", *Machine Design*, 3/1986, pp. 102–106.

Stereolithography, Unveiled, Nov. 23, 1987, Newsweek, p. 3.

Edited by Herausgegeban von, H. U. Lemke, M. L. Rhodes, C. C. Jaffee, and R. Felix, Computer Assisted Radiology Computergestutzte Radiologie, Car '87. pp. 416–423.

Efrem V. Fudim, Sculpting Parts with Light, *Machine Design*, Mar. 6, 1986, pp. 102–106.

Computer Assisted Radiology, proceedings of the International Symposium; "System Integration for the Manufacturing of Custom Proteses and Anatomic Models," Michael L. Rhodes, Yu-Ming Kuo, Stephen L. G. Rothman, pp. 416–423; 1987.

*Primary Examiner*—Edward M. Coven
*Assistant Examiner*—Valerie Szczepanik
*Attorney, Agent, or Firm*—Sandler, Greenblum & Bernstein

[57] ABSTRACT

A method of manufacturing three dimensional anatomic models wherein a series of tomographic hard copy images are obtained of a desired section of a patient's anatomy. The images are used as masks in a "photographic" process to produce layers which are attached together to form the model.

8 Claims, 1 Drawing Sheet

METHOD OF MANUFACTURING ANATOMICAL MODELS

FIELD OF THE INVENTION

This invention is concerned in general with three dimensional anatomical models for use in surgical planning including customizing prostheses; and more particularly with methods of manufacturing such anatomical models without the necessity of complicated CAD/CAM or machine tool equipment.

BACKGROUND OF THE INVENTION

Sophisticated computer and interactive graphic systems such as CAD/CAM written for design and manufacturing have enabled remarkable advances in the fabrication of complex mechanical structures. Such systems have recently been used for medicinal purposes, that is, producing models of sections of the human body for use in surgical planning and/or for the manufacturing of custom prostheses. See, for example, the article entitled "System Integration for the Manufacturing of Custom Protheses and Anatomic Models" by M. L. Rhodes et al, which appeared in the proceedings of the international symposium of computer assisted radiography presented in Berlin, West Germany in 1987.

It is becoming more common for surgeons to utilize three dimensional models made from CT image data for pre-operative planning. The pre-operative planning results in a higher rate of successful operations. Without the custom image analysis brought about by utilization of three dimensional models, the types of prostheses or implants available were made in standard sizes.

There are occasions when standard protheses cannot be used. For example, custom protheses are needed for patients who have congenital degenerative disease or need limb sections due to carcinogenic or traumatic disorders or for patients who are young and active. When the standard off the shelf prostheses were used in the past the adjustments were made by sculpting the patient's anatomy in order to have a firm stable functional reconstruction. Removal of skeletal mass for implanting prostheses is dangerous and reduces the natural reliability of the patients skeleton.

Presently, most of the three dimensional anatomical models are manufactured using CAD/CAM techniques along with expensive tool machines. Most hospitals are not in a position to purchase CAD/CAM equipment and expensive tool machinery for the relatively few times that three dimensional models are needed for pre-operative studies. Accordingly, those skilled in the art are attempting to reduce the cost and the complexity of the equipment needed to produce three dimensional models.

In non-related fields, attempts are also being made to reduce the costs of producing models. For example, an article which appeared in the magazine "Machine Design" on Mar. 6, 1986 entitled "Sculpting with Light" by E. V. Fudim describes a plastic forming process for use in producing complicated parts or models of complicated parts without the necessity of extensive tool machine operations. The process described is a type of photographic process wherein a "mask" provides light and shadow patterns in the form of the part to be constructed. The pattern is directed onto a light sensitive polymer of the type which when exposed to light hardens while the portion in the shadow remains liquid. Thus, sheets of polymer described by the light and shadow pattern of the mask can be produced. Multiple masks can be stacked to produce multilayer parts.

Another device for producing models with photographic like processing is described by "Newsweek" magazine, in the issue of Nov. 23, 1987 on page 3. Therein, the process of building three dimensional plastic prototypes from computerated designs, is described. Apparently, the light used in a photographic technique is controlled by CAD/CAM computerized program. For example, the article describes a "galvananometer mirror scanner" driven by computer generated vectors, to move an ultra-violet laser generated small intense spot of light across the liquid in a pre-programmed pattern, for hardening or photo-polymerizing the plastic in the regions required almost immediately.

Thus, in the described light sensitive manufacturing methods, either special masks are made for providing the light patterns to the photo plastic polymer or CAD/CAM programs are used. To date no use has been made of masks and photo sensitive processes for producing anatomical models. For example, an article of the Computer Assisted Radiology proceedings (CAR'87) at pages 416-423 describes using CT scanner data to feed a CAD/CAM programmed computer to drive expensive tool machines to provide desired models.

Accordingly, there is still a need in medical diagnostics for improving the method of manufacturing three dimensional anatomical models and for improving the final models. The method of manufacturing the models should be inexpensive and use a minimum of equipment and/or outlay for new equipment at the hospitals.

BRIEF DESCRIPTION OF THE INVENTION

Accordingly, in a preferred broad aspect of the invention a method for manufacturing three dimensional anatomical models for use in surgical planning and the like are provided, said method comprising the steps of:

acquiring a series of tomographic hard copy images of a desired anatomical section of a patient, using said hard copy images as masks in a photographic process to produce individual layers, each layer being a tomographic portion of said anatomical section, and attaching said layers together to form a three dimensional model of said anatomical section.

A broad aspect of the actual anatomical model for use in surgical planning and the like comprises:

a plurality of layers made using photographic methods from hard copies of images of a desired section of a patient using tomographic means, and means for attaching said layers together to form a three dimensional model of said desired portion of the patient's anatomy.

In a preferred embodiment the hard copy images feature a frame and/or grids for use in registering and securing together the individual tomographic sections of the individual layers. Thus, the method for manufacturing further features the step of removing the registration means from the three dimensional model where necessary.

According to this invention, laminae of desired thicknesses which depend on the resolution desired, are prepared by photographic means from photo resist or photo plastics, such as photo polymers. Each lamina comprising a section corresponding to a computerized tomographic slice. A standard frame and a positioning network are provided in each lamina. Depending on the size of the section of the body being modelled more laminae can be made from fewer X-ray films by interpolating between the X-ray hard copy film, or a number of laminae can be made from one X-ray film containing multiple images. The individual lamina are stacked and preferably may be laminated to form the solid model.

A benefit of the inventive system is that low cost equipment, that is already standard equipment in hospitals having a standard radiographic department is used; thereby, permitting the preparation of solid models by the radiographic department personnel with little or no additional expenditure for equipment. Thus, the masks are made from the X-ray film; albeit, preferably from a high contrast X-ray film. The inventive process, preferably uses light caused polymerization for producing the laminae. However, it is within the scope of the invention to use photoresist metals for forming the laminae.

BRIEF DESCRIPTION OF THE DRAWINGS

The above mentioned and other features and objects of this invention will be better understood when considered in the light of the following description of a broad aspect of the invention taken in conjunction with the following drawings, wherein.

GENERAL DESCRIPTION

Figures 1, 2:
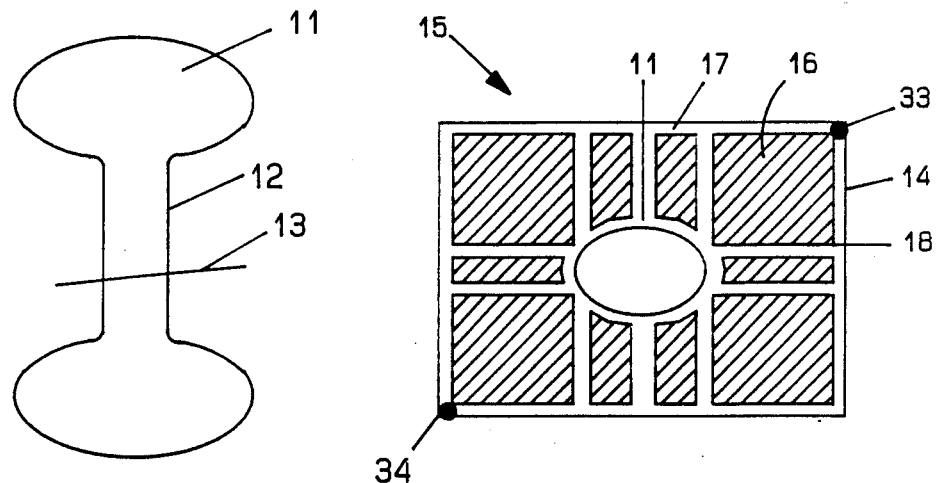
FIG. 1 is a front view of a bone shown by way of example as a section of the patient's body.
FIG. 2 is a hard copy tomographic image of the bone of FIG. 1.

FIG. 1 shows a plan view of a bone 11 located somewhere in the patient's body. The bone is merely used as an example of a portion of the body that is to be modelled. In many ways it is a poor example because it contains a non-changing or slowly changing section, such as the stem section 12. However, it is believed that by using the bone as the portion of the body being modelled, the invention is described so that those skilled in the art can practise the invention.

FIG. 2 shows a hard copy image obtained from a medical diagnostic imaging device such as a computerized tomographic scanner, for example. The image is taken at a section through the bone 12, such as at line 13, in the middle of the bone. The hard copy is preferably a high contrast type film to be sure that the photographic method produces sharp contours in the model.

During the formation of the image, the imaging equipment is instructed to provide an image having a frame shown at 14, surrounding the periphery of the image 16. The bone 11 is shown in the center of the frame. The imaging equipment also provides a grid as a portion of the image. The grid is shown by lines such as vertical line 17 and horizontal line 18, for example.

In the photographic process the laminae are made directly from the mask. The mask is the hard copy image produced directly by the tomographic imaging equipment. In the embodiment described, the portion containing bone that will be modelled is transparent and the section of the image that has no bone is opaque. Therefore, the grid, the bone and the frame are transparent sections with the sections between the grid, the bone and frame being solidly dark opaque sections.

Figure 5:
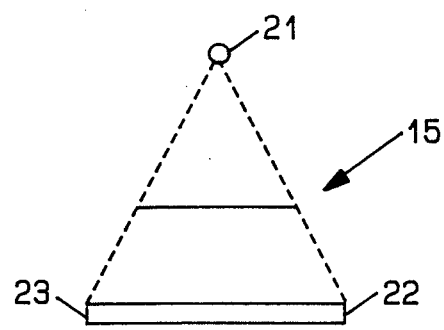
FIG. 5 is a schematic showing of the photographic process of casting the light and dark areas of the mask onto a light sensitive material to form a layer.

As shown in FIG. 5, a light source 21 is provided on one side of mask 15. On the other side of the mask is a container 22 having a liquid photosensitive polymer 23 therein. When the light passes through the image, then the portions of the photoplastic that are struck by the light polymerize or solidify. It is these solidified portions which make up the layer 26 shown in FIG. 3. The layer 26 has a peripheral frame indicated as 27. The grid such as grid line 28 connects the bone and the frame. Registering pinholes may also be provided in the frame at selected positions. In making models such as bones having smooth non-changing sections the pinholes may preferably be placed in the bone itself, such as shown at 31 and 32. At least, two registration holes are provided. The holes or the places where the holes should be are shown, for example, in the mask as darkened portions 33 and 34 in FIG. 2.

The layers are attached together. It should be understood that layes may be constructed even at positions of the bone where there are no images by interpolating between the actual images. Alternatively, the layers themselves may be made thicker by processes such as using more intense light means 21 or applying the light for a longer period of time so that a thicker section of plastic can be polymerised or solidified.

Figures 3, 4:
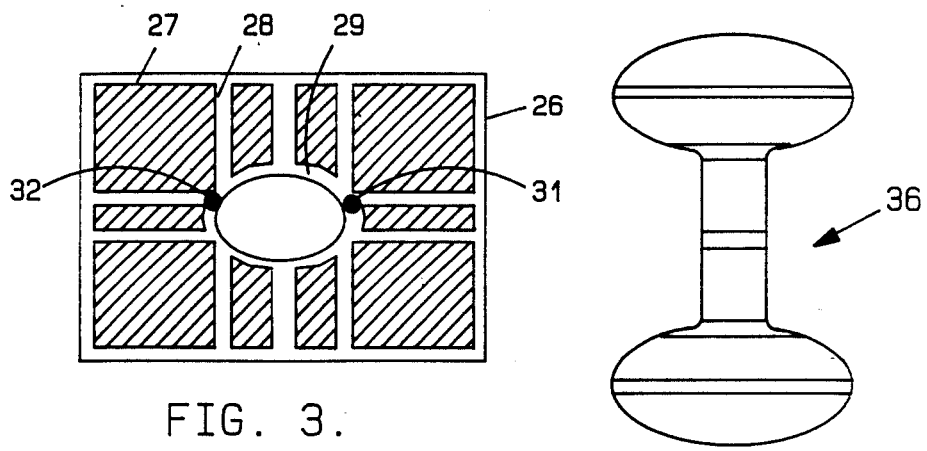
FIG. 3 is a layer made from the hard copy image of FIG. 2.
FIG. 4 is a model of FIG. 1 made by joining together layers, such as the layer of FIG. 3.

While FIG. 4 shows the model at 36 without a frame around it; of course, the model is first put together from the layers that include the frame and the grid and which will be cut away for many of the model's uses. For example, if the model is used for fashioning a customized prothesis then the frame and grid are cut away.

There are uses, of course, when the frame and grid may be left together, that is, when the middle section or the hollow section of the bone is the section of interest for the surgeon.

Thus, there has been disclosed an unique anatomical model and a method for making the model which requires no expensive equipment that is not already available in the radiological department of most hospitals.

While the invention has been described using exemplarary embodiments, it should be understood that these embodiments are by way of example only and not as limitations on the scope of the invention.

What is claimed is:

1. A method for manufacturing three-dimensional anatomical models for use in surgical planning and the like, said method comprising the steps of:

acquiring a series of tomographic hard copy images of cross section of desired portions of anatomy of a patient, said images having transparent and opaque portions, using said hard copy images as masks in a photographic process wherein layers are produced by passing light through transparent portions of the hard copy images onto photosensitive material whereby the photosensitive material is hardened in areas where the light passes through to depict corresponding sections of the desired portions of anatomy of a patient, and attaching said layers of light hardened photosensitive material contiguously together to form a three-dimensional model of said desired anatomical section.

2. The method of claim 1 including the steps of acquiring tomographic image data of desired anatomical sections of the patient,
  using said data to obtain hard copy images of the desired anatomical section of the patient,
  interpolating between the acquired tomographic data to obtain tomographic data of the desired anatomical section where data was not acquired, and
  using said interpolated tomographic data to provide futher hard copy images for forming said three dimensional model.

3. The method of claim 1 including the step of providing registration means on each of said layers for alignment purposes.

4. The method of claim 3 wherein the step of providing registration means comprises providing holes in each of said layers for receiving pins and in stacking said layers using said holes to provide said three dimensional model.

5. The method of claim 3 including providing holes in said frame for receiving aligning pins therein.

6. The method of claim 1 wherein said hard copy images are high contrast images.

7. The method of claim 1 wherein the step of attaching said layers includes bonding said layers together.

8. The method of claim 5 including the step of removing said frame and grids from the final model.

* * * * *